(12) United States Patent
Schreiber et al.

(10) Patent No.: US 9,705,368 B2
(45) Date of Patent: Jul. 11, 2017

(54) ELECTRICAL MACHINE

(71) Applicant: Bühler Motor GmbH, Nürnberg (DE)

(72) Inventors: Thomas Schreiber, Freystadt (DE); Georg Bonk, Oberasbach (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 15 days.

(21) Appl. No.: 15/017,036

(22) Filed: Feb. 5, 2016

(65) Prior Publication Data

US 2016/0156234 A1    Jun. 2, 2016

Related U.S. Application Data

(63) Continuation of application No. PCT/DE2014/200246, filed on Jun. 5, 2014.

(30) Foreign Application Priority Data

Aug. 9, 2013   (DE) .................. 10 2013 215 812

(51) Int. Cl.
*H02K 1/28*   (2006.01)
*H02K 1/27*   (2006.01)
*H02K 15/03*   (2006.01)

(52) U.S. Cl.
CPC ............ *H02K 1/274* (2013.01); *H02K 1/276* (2013.01); *H02K 1/28* (2013.01); *H02K 15/03* (2013.01)

(58) Field of Classification Search
CPC ........... H02K 1/274; H02K 1/276; H02K 1/28
See application file for complete search history.

(56) References Cited

U.S. PATENT DOCUMENTS 5,894,182 A *  4/1999  Saban .................... H02K 1/06
                                                       310/216.013
2012/0133229 A1   5/2012  Jayasoma et al.

FOREIGN PATENT DOCUMENTS

DE    10 2007 029719 A1   8/2008
DE    10 2009 045101 A1   4/2011
WO       2007/068515 A1   6/2007

OTHER PUBLICATIONS

English translation of International Search Report dated Sep. 16, 2015, issued in counterpart application No. PCT/DE2014/200246 (2 pages).

* cited by examiner

*Primary Examiner* — Dang Le
(74) *Attorney, Agent, or Firm* — Westerman, Hattori, Daniels & Adrian, LLP

(57) ABSTRACT

An electrical machine, in particular an electric motor, including a rotor, which has a laminated core made up of stacked laminating sheets having at least two tangentially extending holes, in each of which at least one permanent magnet is at least largely accommodated, at least one laminating sheet having at least one elastic arm, which is arranged between the at least two permanent magnets and lies against a permanent magnet and resiliently acts on said permanent magnet substantially in a tangential direction.

15 Claims, 7 Drawing Sheets

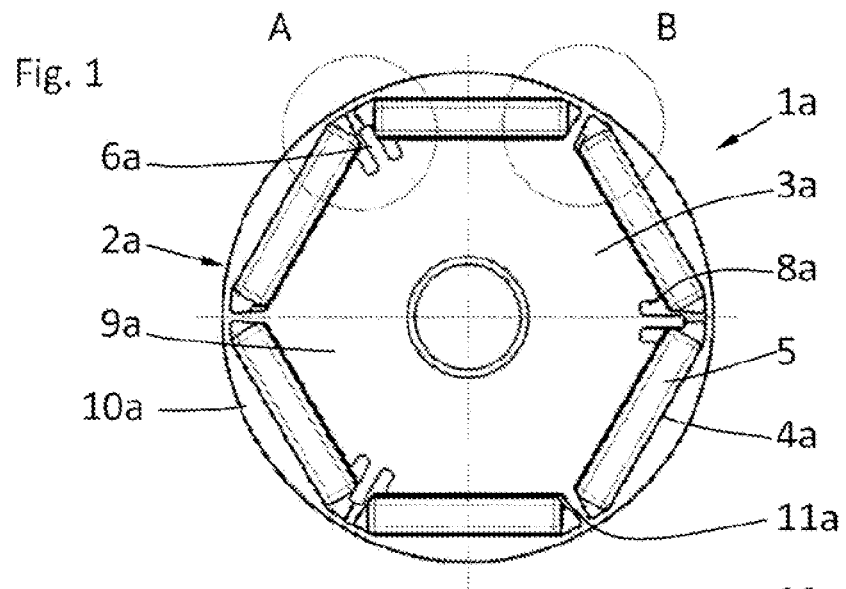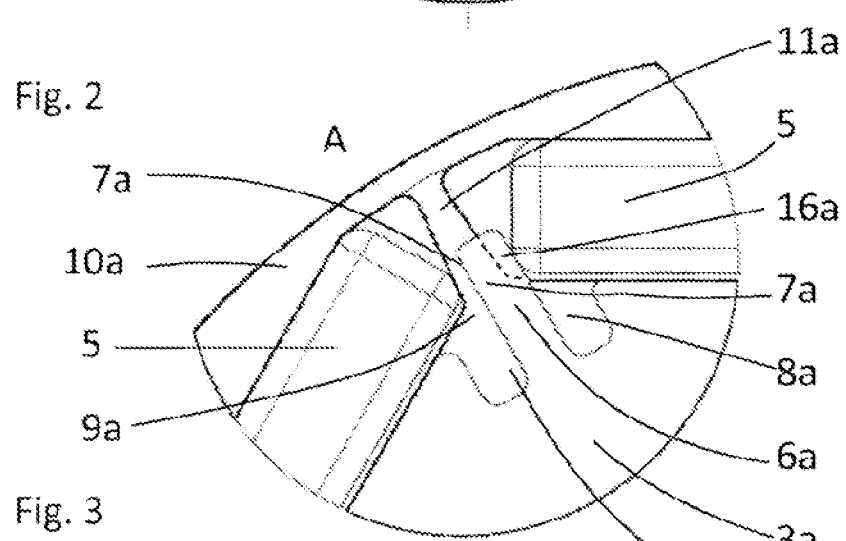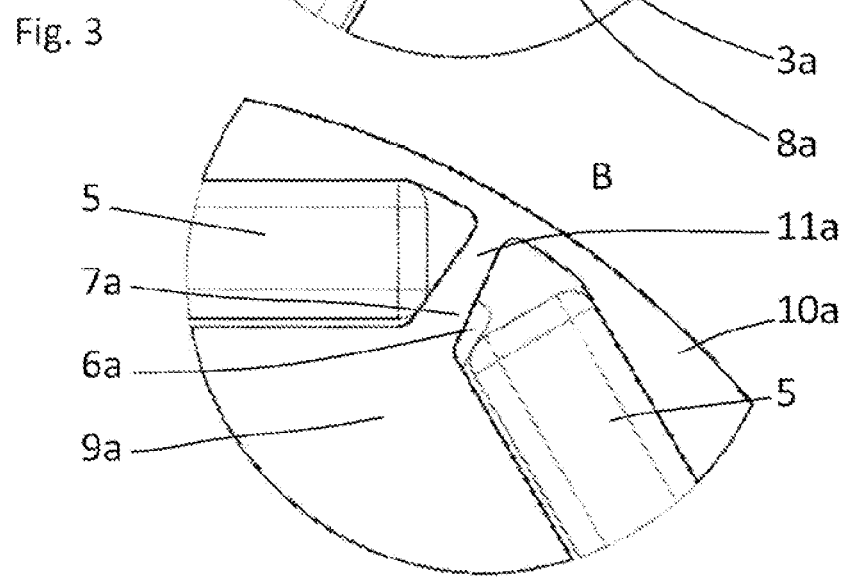

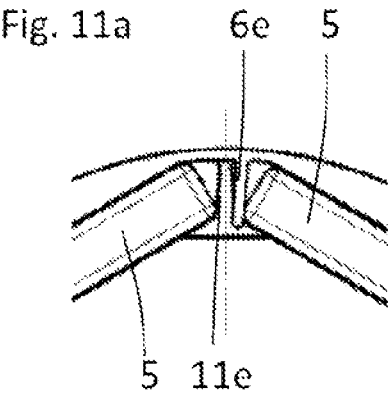
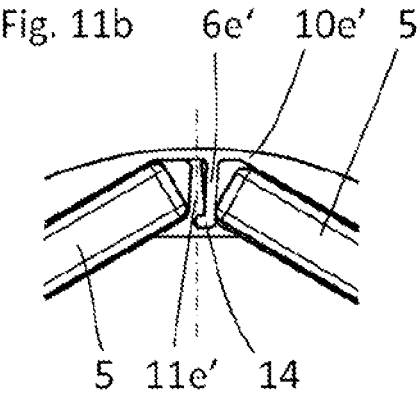
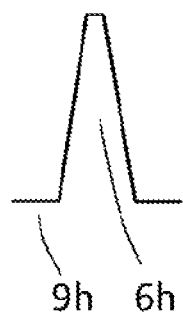
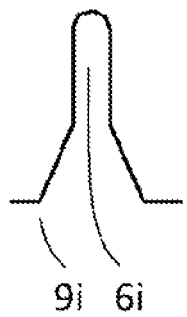
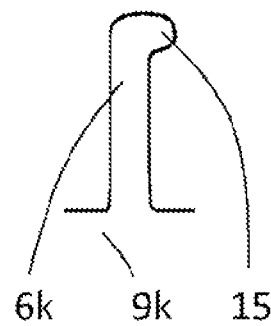
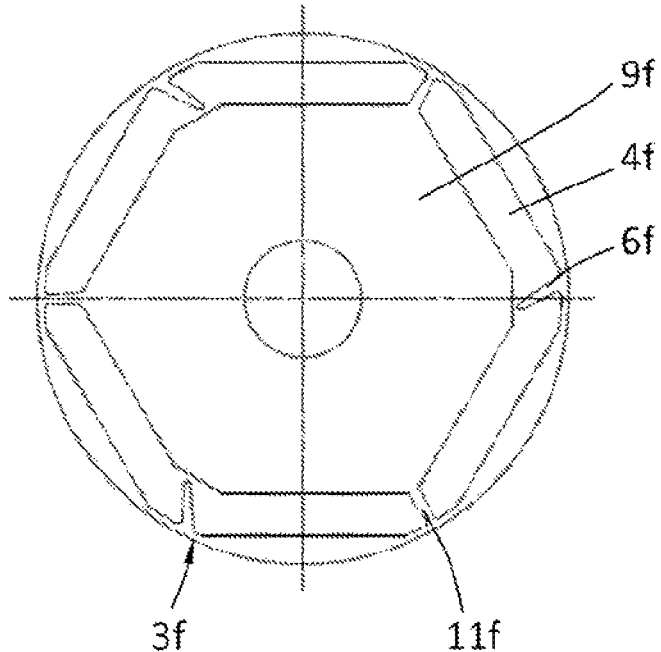

ELECTRICAL MACHINE

BACKGROUND OF THE INVENTION (1) Field of the Invention

The invention relates to an electrical machine, in particular an electric motor, having a rotor with a laminated core consisting of stacked laminating sheets having tangentially extending slots in each of which at least one permanent magnet is accommodated.

(2) Description of Related Art Including Information Disclosed Under 37 CFR 1.97 and 1.98

DE 10 2007 029 719 A1 discloses a common electrical machine in which both tangentially acting and radially acting elastic arms are described for reducing the play between the permanent magnet and the slot in the laminated core. In electrical machines, such play causes increased cogging torque, which is perceptible or may cause increased noise to develop in some applications, such as power steering systems. To facilitate assembly of the permanent magnets, not all of the sheets are equipped with elastic arms, but rather adjoining sheets have a recess at the same position. The known solution has the disadvantage that the elastic arms become bent in the motor's axial direction when the permanent magnets are joined, whereby the sheet edge rubs on the permanent magnet and forms chips. The formation of chips is explained primarily by the fact that the arms to be bent are relatively short, resulting in high bending forces. Furthermore, the elastic arms are sometimes arranged in areas that should have the least possible amount of resistance to the magnetic flux. A change in the geometry to achieve different elasticities would also always affect efficiency. Extending the spring arms would increase the resistance in the magnetic circuit and decrease efficiency. Even with an extension of the spring arms, they would bend during assembly. Furthermore, undesirable chip formation from the sheet edges due to shavings from the permanent magnet must also be expected.

BRIEF SUMMARY OF THE INVENTION

The object of the present invention is thus to provide an electrical machine for which the assembly and possible disassembly is facilitated, the risk of chip formation is reduced, the number of parts is reduced, easier adaptability to different geometries and application conditions is accomplished, and improved efficiency and a greater power density is achieved.

The present invention is for an electrical machine, particularly an electrical motor, having a rotor which has a laminated core made up of stacked laminating sheets having at least two tangentially extending slots, in each of which at least one permanent magnet is to a large extent accommodated and at least one of the laminating sheets has at least one elastic arm which is arranged between the at least two permanent magnets and lies against one of the at least two permanent magnets and acts resiliently upon the permanent magnet in an essentially tangential direction. The elastic arm of the one laminating sheet, with a first area of its axial surface, makes two-dimensional contact with a contact area of a further adjacent laminating sheet and is guided essentially tangentially thereby in a manner that resists torsion and/or bending. The elastic arm with a further area of the same axial surface cannot make contact on the same further laminating sheet, and the elastic arm is substantially plastically deformed by the permanent magnet in the tangential direction and rests elastically against the magnet.

In explaining the subject invention, certain terms need to be defined with reference to the Figures. "Flat contact areas" means that the elastic arm 6 makes contact with the contact area 7 over at least one quarter of its total surface area. However, the term "flat contact areas" also refers to a smaller area if the contact areas are geometrically designed such that the elastic arm 6 makes contact with the contact area 7 at least in one area over at least one quarter of its width in the tangential direction. Furthermore, "between two permanent magnets" means that the elastic arm extends at least far enough into an area between adjacent permanent magnets that it can reliably retain one of the permanent magnets under all dimensional deviations and anticipated temperature changes of the electric machine. The elastic arm may also, however, have a significant portion arranged in this area or even extend beyond this area. The term "axial" means normal with respect to the laminating sheet plane, i.e. parallel with respect to the rotor axis. The term "tangential" refers to a tangent on a circle around the rotor axis in the laminating sheet plane.

However, because the elastic arm of a laminating sheet makes contact only axially and two-dimensionally with a part of its axial surface against a contact area of an adjacent laminating sheet and is guided tangentially, this cannot cause the spring arm to bend in the axial direction, i.e. in the joining direction, which results in significantly less chip formation. Deflection occurs only in the tangential direction in which the elasticity of the arm is sufficiently great. Because of the support, a very tight bending radius would be necessary for deformation, which would require an equally great bending force. Thus, the elastic arm deflects tangentially. The arms move like a slide between the adjacent lamination sheets. This is facilitated by corners, chambers, or radii, which the permanent magnets have at least at the points of contact with the elastic arms. During the joining process, a tangential force component results with the help of these corners, chamfers, or radii. Preferably, the direction of punching during manufacture should match the direction of joining of the permanent magnets so that the punching burr does not make contact with the permanent magnet. The described solution also allows more than one permanent magnet to be installed in a slot, both axially and tangentially.

The elastic arms are plastically deformed in the tangential direction when installed and must compensate only for temperature-caused changes in length in this state. The potential elastic spring-back path is approximately double the size of the expected maximum length compensation. The geometric tolerances of the laminating sheet section and the permanent magnets can be compensated for by the elastic deformation and do not affect the required spring-back path after assembly. The solution according to the invention guarantees a tight fit for the permanent magnets at all anticipated temperatures of the electric machine. The elastic arm makes contact with only a part of its axial surface with a contact area in an adjacent touching laminating sheet, while another part of the permanent magnet must remain movable in the direction of the contact area, whereby a retaining force is generated. During operation, temperature fluctuations may cause the elastic arm to move slightly on the contact surface.

It is important that at least one part of the non-adjacent area extend up to a contact point of the permanent magnet with the elastic arm, because tolerance compensation must take place in this area. The slot should be at least large enough such that permanent magnets may also be mounted at the upper tolerance limit. The non-adjacent area must accordingly cover at least the entire tolerance area between the largest dimension and the smallest dimension in the tangential direction and must at least enable pretensioning. The protected scope also covers electrical machines in which not all of the elastic arms are plastically deformed.

Because the elastic arm is guided between two contact surfaces of adjacent laminating sheets on either side of the laminating sheet having the elastic arm, bending of the elastic arm is even better prevented because bulging up against the joining direction is also suppressed. Accordingly, the elastic arms are guided into a type of sandwich position. Obviously, this does not apply to the first elastic arms at the ends of the laminated core. It is also conceivable for the directly adjacent laminating sheets to not be furnished with contact surfaces but rather laminating sheets further away having offset areas, for example. This more complex solution could be used, for example, when tangential deflection is more difficult due to burr formation when the sheets are punched during manufacture. These difficulties may be prevented if necessary by deburring, by burr-free punching, or by reducing the thickness of the laminating sheet by pressure forming. Some of these measures may also be integrated into the punching process.

In order to achieve a particularly great retaining force for the permanent magnet, it is possible for the elastic arm to be guided, on one side, on a contact area of another laminating sheet of the laminated core and, on the other side, to rest against another elastic arm of an adjacent laminating sheet of the laminated core, such that two or more elastic arms are guided as a unit between two contact areas of two additional laminating sheets of the laminated core. This should mean that two or more elastic arms lie against one another and are deflected during assembly by the permanent magnet at the same time or shortly one after another and plastically deformed. Each of the outer adjoining surfaces lies at a contact area of another laminating sheet.

In a further especially preferred embodiment of the invention, the contact areas have connecting rods between an outer ring and a core area. These connecting rods are present with this construction anyway and do not necessarily have to be geometrically adapted. The contact surface does not have to be very wide due to the slight tangential deflection of the elastic arms; therefore, narrow connecting rods can be used for this purpose.

The aforementioned effect of the tangential force is optimally utilized when the elastic arm is less deflected at the point of contact with the permanent magnet than an edge or corner radius or a lead-in chamfer of the permanent magnet. Thus, it is assured that there is a tangential force component at the very beginning of the joining process. The lead-in chamfer may be present exclusively on the side on which the spring arms engage. Instead of a lead-in chamfer, an enlarged radius may also be provided at the permanent magnets.

It is provided that the elastic arm lies against a permanent magnet in the area of an edge. The result of this is that the permanent magnet not only lies at the edges of the slot in the tangential direction but also in the radial direction with respect to the rotational axis. Another option is for the elastic arm to rest against a side surface of the permanent magnet. It may be necessary or it may prove to be advantageous to allow the point of contact of the elastic arm with the permanent magnet to protrude through a bulge or retaining collar, for example, in order to reach behind an edge of the permanent magnet and create enough space from the edge as clearance.

The force exerted by an elastic arm onto the permanent magnet may be varied by simple geometric changes. It is sufficient to reduce the force to have a recess at the root of the arm and thus extend its length. At the same time, the possible deflection angle within the elastic area is enlarged. The recesses should be large enough such that, on one hand, the service life of the punching tool is sufficiently long but, on the other hand, small enough such that there is the least loss in efficiency. The recesses in this case also contribute to enlarging the guiding surfaces for the elastic arm, thereby reducing the tendency to deform.

Essentially the following holds true: the larger the number of elastic arms per slot and magnet, the higher the achievable retaining force and the higher the joining force. The greater the number of elastic arms, the lower the possible force that can also be generated by a single arm. In order to manage with a single section of laminating sheet, it is proposed that each laminating sheet have at least one elastic arm and multiple potential contact areas.

It is further proposed that laminating sheets positioned behind one another be rotated opposite one another by at least one rotor pole pitch. With one 6-pole rotor and one elastic arm per sheet, for each slot, each sixth laminating sheet would be equipped with an elastic arm. When there are two arms per laminating sheet, then every third laminating sheet would be equipped with an arm, and with three arms per laminating sheet, every second laminating sheet.

If an even lower number of elastic arms per slot is selected, another arrangement would be reasonable, in which the laminating core is made up of different laminating sheets, in which a first lamination type is formed with elastic arms and a second lamination type is formed without elastic arms but with contact areas.

It is most particularly preferred when two slots of a laminating sheet between which the elastic arm is arranged are connected to one another such that they form a single slot. This embodiment increases the elasticity of the magnetic mount because the external ring is hereby less rigidly connected to the core area.

Appropriately, it is provided that the laminating sheets are aligned with one another and precisely with respect to one another by interlocking means in a way that resists rotation. This results in a unique arrangement of the slots for the permanent magnets.

The elastic arm preferably rests with at least one fourth of its entire surface against the contact area or the elastic arm rests with at least one fourth of its width on the contact area in the tangential direction in at least one area.

In order to ensure even more reliable guidance, it is provided that the elastic arm rests with at least a third of its entire surface on the contact area of an adjacent laminating sheet or for the elastic arm to rest on the contact area of an adjacent laminating sheet over at least a third of its width in the tangential direction in at least one area.

It is especially important that the elasticity of the elastic arm be designed such that the moment of its deflection is significantly less than a bending moment that would cause a deformation of the elastic arm. The bending moment is determined by a dimension with which the elastic arm freely protrudes into the slot without being supported and guided by an adjacent laminating sheet. The further the arm freely protrudes into the slot, the easier it is to be bent. The same holds true for the guiding surface between adjacent laminating sheets. The larger this guiding surface, the less the risk of tilting between the laminating sheets and thus an increase in the friction force of diverting of the elastic arm. The elasticity of the arm is determined by its width, its shape, and its length.

In order to prevent bending and/or torsion of the elastic arm, it is especially advantageous if the non-adjacent area of the elastic arm has a smaller surface area than the adjacent area between the permanent magnet and the adjacent area, and/or if the tangential width of the non-adjacent area of the elastic arm between the permanent magnet and the adjacent area is less than the tangential width of the adjacent area. Thus, the guiding surface is larger than the potential deformation surface.

When producing the laminated core, it is provided that the laminated cores are aligned with respect to one another and precisely with respect to one another by interlocking means in a way that resists torsion. Normally, a punch-packaging process is used to achieve a tight connection of the laminating sheets with each other.

BRIEF DESCRIPTION OF THE SEVERAL VIEWS OF THE DRAWINGS

The invention is explained below in more detail using exemplary embodiments. The following is shown:

FIG. 1 shows an axial view of a rotor of a first embodiment of the invention;

FIG. 2 shows an enlarged section, A, from FIG. 1;

FIG. 3 shows another enlarged section, B, from FIG. 1;

FIG. 11a in an axial view shows a first variant of the second embodiment;

FIG. 11b in an axial view shows an advantageous further embodiment from FIG. 11a;

FIG. 11c symbolically shows a variant of the elastic arm according to FIGS. 1, 2, 3, and 5;

FIG. 11d symbolically shows a second variant of the elastic arm according to FIGS. 1, 2, 3, and 5;

FIG. 11e symbolically shows a third variant of the elastic arm according to FIGS. 1, 2, 3, and 5;

FIG. 12 in an axial view shows a second variant of a sheet section of the second embodiment;

DETAILED DESCRIPTION OF THE INVENTION

Figure 4:
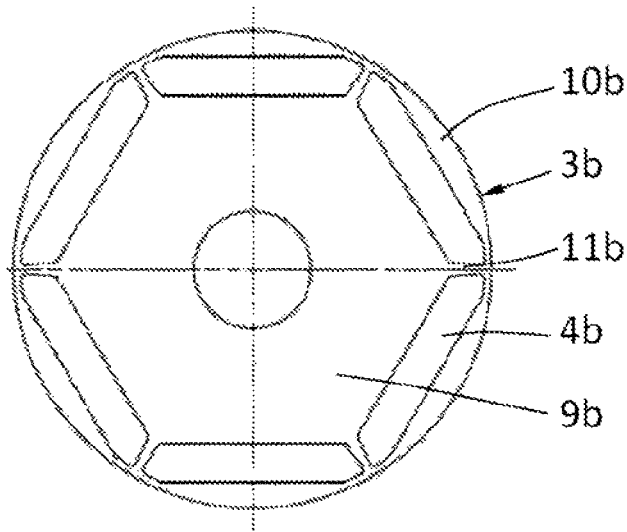
FIG. 4 shows an axial view of a laminating sheet without elastic arms.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows an axial view of the rotor 1a of an electrical machine according to the invention consisting of a laminated core 2a comprising stacked laminating sheets 3a having slots 4a for permanent magnets 5 accommodated therein. Each of the laminating sheets 3a have elastic arms 6a to which a pair of recesses 8a connect. Each of the elastic arms 6a are formed as a single piece with a core area 9a of the laminated core 2a. Each of the laminating sheets 3a in the example shown comprises three elastic arms 6a spaced apart from one another at an angle of 120° and three connecting rods 11a arranged alternating with the elastic arms 6a and formed as a single piece with an outer ring 10a and the core area 9a. A second adjacent laminating sheet is partially visible. It is rotated by 60° compared to the first laminating sheet. With the second laminating sheet, substantial parts of the elastic arms 6a and the rods 11a are shown.

FIG. 2 shows an enlarged section from FIG. 1. It is clear that the elastic spring arm 6a is supported axially on a contact area 7a of an adjacent laminating sheet and is tangentially guided. Only a small part (area 16a) of the entire elastic arm 6a protrudes freely into the slot 4a. Due to the large guiding surface, the elastic arm 6a can deflect only tangentially when joining the permanent magnet 5 because the tangential deflection forces are significantly less than the bending forces at a tight radius around the boundary edge of the contact area 7a. The elastic arm 6a acts upon a rounded-off edge of a permanent magnet 5 such that it presses both tangentially and radially against the boundary of the slot 4a and impacts it elastically. With the assistance of different recesses 8a, the length of the elastic arms can be increased or reduced, and thus the deflection force can be varied depending on requirements.

FIG. 3 shows a further enlarged section from FIG. 1. An area rotated by 60° as compared to FIG. 2 can be seen more clearly. A connecting rod 11a between the outer ring 10a and the core area 9a is shown in its entirety. A part of the connecting rod 11a simultaneously forms the contact area 7a for an elastic arm 6a of an adjacent laminating sheet, which is shown here, and a contact area positioned oppositely for the spring arm 6a of an additional laminating sheet positioned below.

FIG. 4 shows an axial view of a laminating sheet 3b without elastic arms. This sheet section may be additionally combined with other laminating sheets in order to extend it without increasing the joining force for the permanent magnets. The laminating sheet 3b also has a core area 9b, slots 4b, a ring 10b, and rods 11b.

Figure 5:
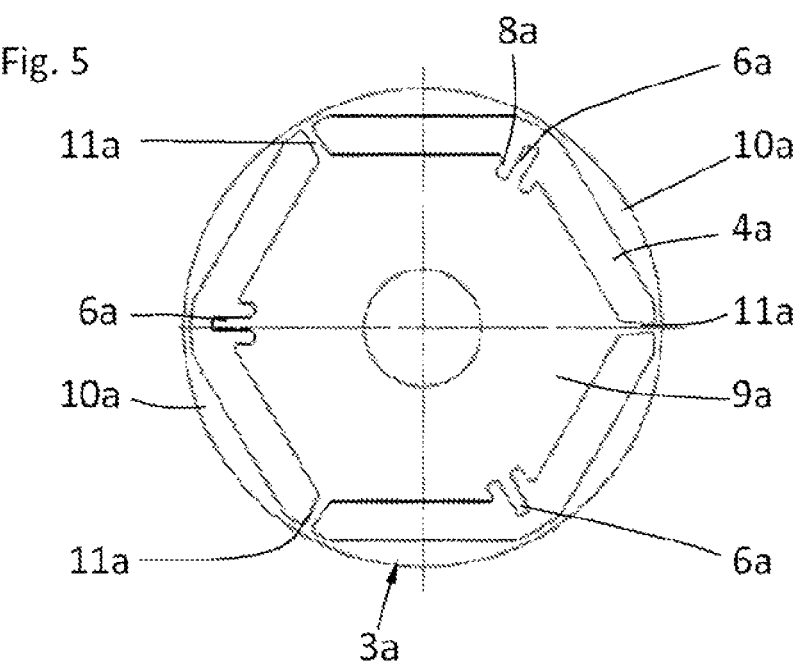
FIG. 5 shows an axial view of a laminating sheet with elastic arms.

FIG. 5 shows an axial view of a laminating sheet 3a with elastic arms 6a. The elastic arms 6a alternate with the rods 11a, which serve as connecting areas between the outer ring 10a and the core area 9a. It is possible to achieve the guidance function according to the invention with a single laminating sheet section in that each of the sequential laminating sheets is rotated by one pole pitch as compared to the previous one. Each of the elastic arms 6a is arranged thereby between two rods 11a from adjacent laminating sheets and is guided by them. If the joining forces for the magnets must be reduced, however, it is also possible to insert additional laminating sheets 3b according to FIG. 4, which are formed without elastic arms and thus do not contribute to the retaining force for the magnets. The recesses 8a are dimensioned such that they enable the spring arms 6a to be deflected but are as small as possible, which causes the least possible amount of flux leakage.

Figure 6:
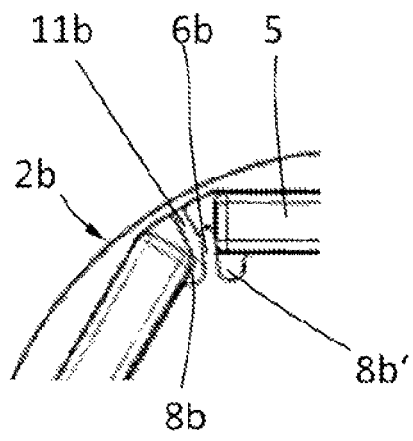
FIG. 6 in an axial shows a first variant of the first embodiment.

FIG. 6 shows a first variant of the first embodiment in a partial axial view. The spring arm 6b of a laminated core 2b is not parallel to the connecting rod 11b of an adjacent laminating sheet, but is rather approximately parallel to a side surface 12 of an affixing permanent magnet 5. The spring arms in this case lie on the respective permanent magnet 5 over a large area and the recesses, 8b and 8b', have different shapes.

Figure 7:
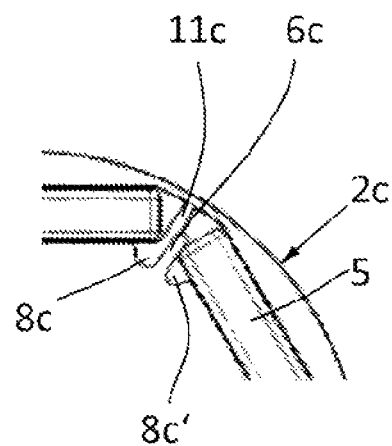
FIG. 7 in an axial view shows a second variant of the first embodiment.

FIG. 7 shows a second variant of the first embodiment in a partial axial view. In this case, the spring arm 6c of a laminated core 2c is arranged parallel to the connecting rod 11c of an adjacent laminating sheet, but is narrower. This reduces the bending forces. Differently shaped recesses, 8c and 8c', also result in this case. This variant enables the magnets 5 to be more easily joined.

Figure 8:
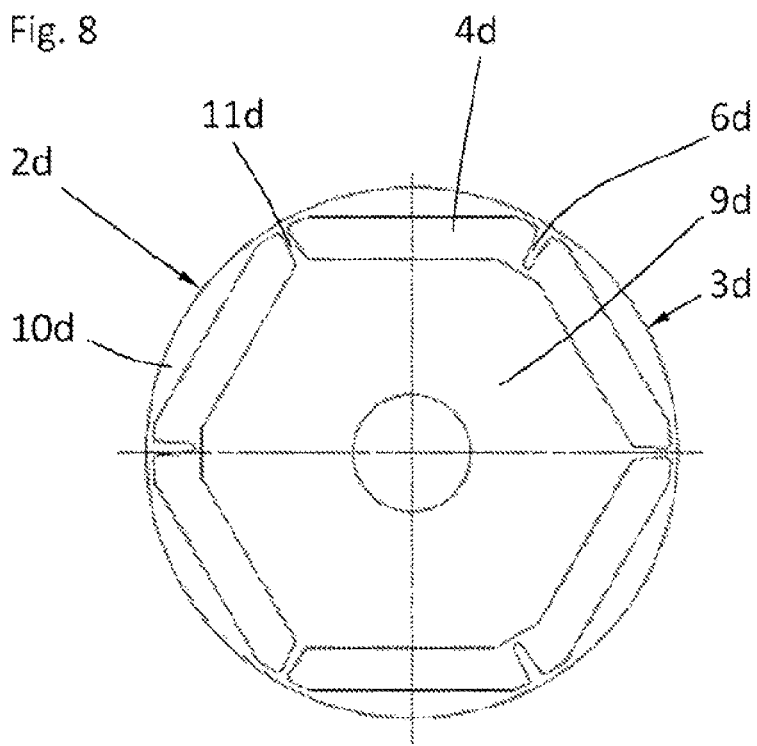
FIG. 8 shows an axial view of a laminating sheet of a second embodiment.

FIG. 8 in axial view shows a second embodiment of the invention. Here, the spring arms do not extend from the core area 9d of the laminating sheets 2d, but rather extend from the outer ring 10d. They extend from the outside to the inside. Because there are only three connecting rods 11d in the example shown, the outer ring 10d is inherently more elastic than the core area 9d. This also affects the elasticity of the spring arms 6d. This makes it easier to mount the permanent magnets.

Figure 9:
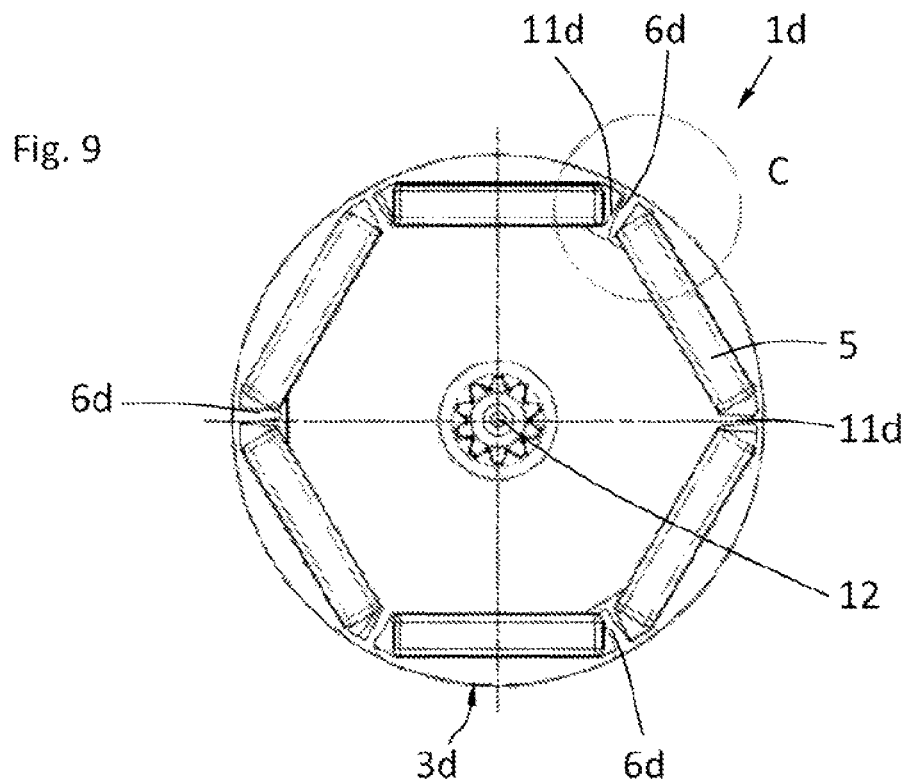
FIG. 9 shows an axial view of a rotor of the second embodiment.

FIG. 9 shows an axial view of a mounted rotor 1d according to the second embodiment having the laminating sheets 3d, the elastic spring arms 6d, the connecting rods 11d, and the permanent magnets 5.

Figure 10:
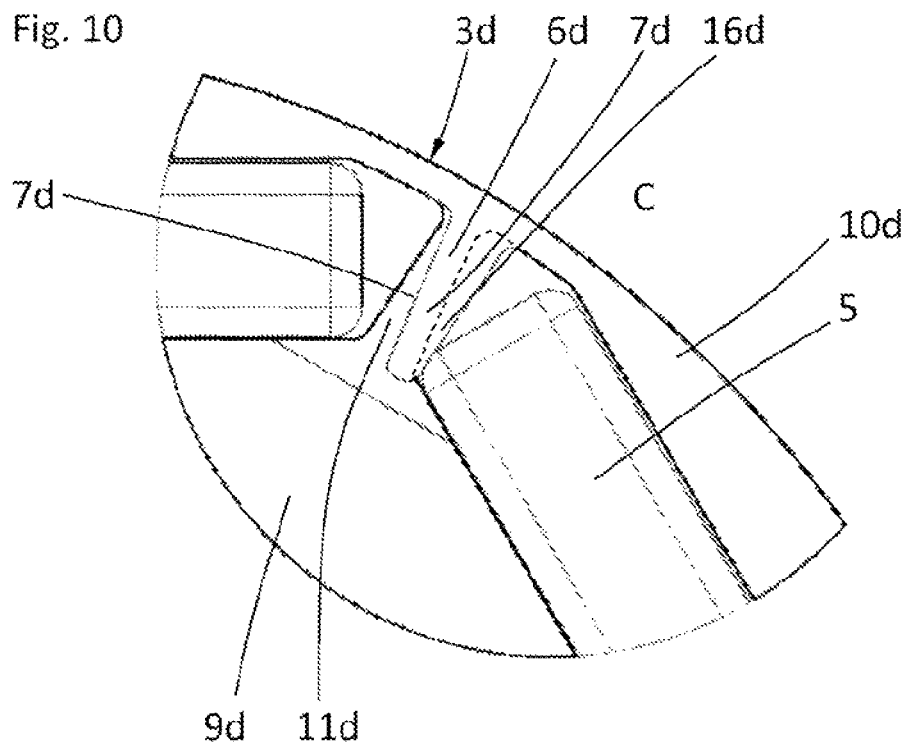
FIG. 10 shows an enlarged section, C, from FIG. 9.

FIG. 10 more clearly shows a section, C, from FIG. 9. In this case, particularly the surface overlapping between the spring arms 6d of one laminating sheet and the connecting rods 11d of another adjacent laminating sheet can be clearly seen. The spring arm 6d is not connected to the core area 9d and can thus adapt itself to the dimensions of the permanent magnet 5 and deflect. The spring arm 6d tapers down to its free end. An area 16d of the spring arm 6d does not lie against the contact area 7d of the adjacent laminating sheet. The non-contact area 16d is significantly smaller than the contact area 7d. Deformation during the joining process is thereby prevented.

FIG. 11a in a partial axial view indicates, in a first variant of the second embodiment, that the elastic arm 6e may also be narrower in order to enable easier deflection during assembly and insertion of the permanent magnets 5. Due to the thin arm however, the contact surface is reduced, such that the arm is no longer as well guided as with the embodiment in FIG. 10. For easier deflection as well as for good guidance, the elastic arm may also be provided with additional guidance areas arranged radially closer to the rotational axis 12 (see FIG. 9), while they are narrower in an elastic area.

An advantageous further embodiment of FIG. 11a is also shown in FIG. 11b. In this case, the end of the elastic arm 6e' is made wider by a guidance projection 14, so that there is improved guidance during assembly of the permanent magnets 5. Simultaneously, as with FIG. 11a, there is a reduced cross-section in the vicinity of the outer ring; as previously mentioned, this guiding surface should amount to at least one fourth of the width of the elastic arm in the tangential direction. The larger the contact surface, the better the guidance and mounting capacity of the permanent magnets 5.

FIG. 11c shows a variant of the elastic arm according to FIGS. 1 to 3 and 5. By widening the elastic arm 6h in the core area 9h from which it extends, voltage spikes are reduced and elasticity is increased. In addition, the degree of deformation is reduced.

In a second variant of the elastic arm according to FIGS. 1 to 3 and 5, as shown in FIG. 11d, the elastic arm 6i does not taper continuously, but rather starting from the core area 9i initially tapers sharply to about the middle and then remains constant.

FIG. 11e shows a third variant of the elastic arm according to FIGS. 1 to 3 and 5, in which the free end of the elastic arm 6k is equipped with a retaining collar 15. This retaining collar 15 serves to change the action point of the elastic arm 6k on the permanent magnet and/or to establish clearance between elastic arm 6k and the permanent magnet. In doing so, the elastic arm 6k has a constant width from the core area 9k up to the retaining collar 15. These variants and other embodiments may also sometimes be combined with one another to achieve the desired properties.

FIG. 12 in an axial view also shows another option for improving guidance. In this case, a laminating sheet 3f is shown having elastic arms 6f which are tilted by about 30 to 45° degrees compared to a radial direction. This provides guidance over a large area, even under different deflection angles of the elastic arms 6f. Furthermore, their length is increased and thus their spring properties. The elastic arms separate two areas, which serve as slots 4f for the permanent magnets. Three elastic arms 6f and three radial rods 11f are provided in this example, as well; however, this is only an example. The number of elastic arms and rods depends on the number of poles and/or on the number of permanent magnets.

Figure 13:
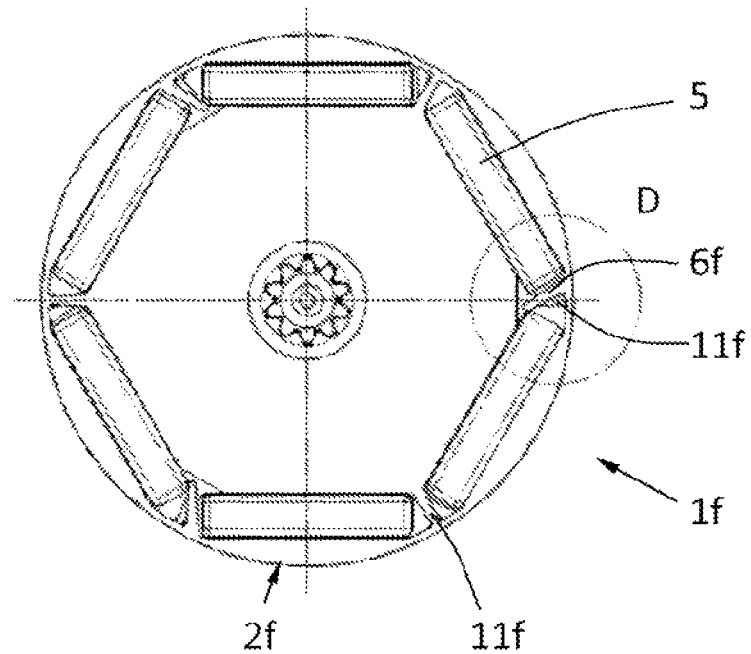
FIG. 13 in an axial view shows a mounted rotor according to the second variant from FIG. 12.

FIG. 13 in axial view shows a rotor 1f mounted with permanent magnets 5 according to the second variant from FIG. 12. In this case, a number of laminating sheets are arranged behind one another and form a laminated core 2f. Identical laminating sheets arranged directly behind one another are rotated by one pole pitch with respect to one another. Elastic arms 6f thereby alternate with rods 11f.

Figure 14:
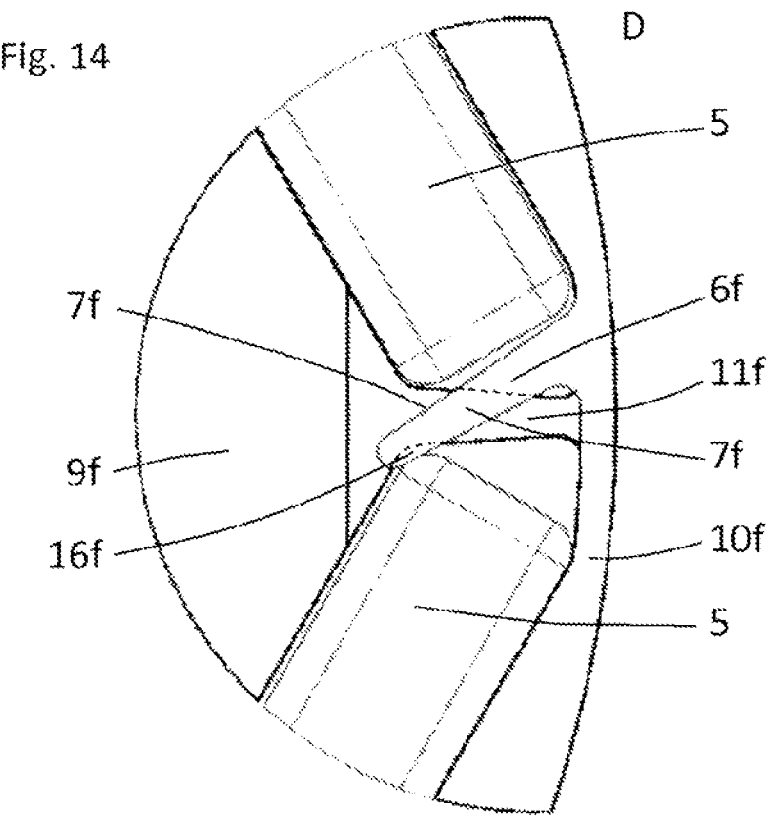
FIG. 14 shows an enlarged section, D, from FIG. 13.

FIG. 14 shows an enlarged section, D, from FIG. 13. The contact areas 7f with an adjacent laminating sheet, the elastic arms 6f, the non-contact area 16f thereof, and the rods 11f can be more clearly seen here. The contact areas serve as the guiding surfaces. In this example as well, the elastic arms 6f extend from an outer ring 10f toward the inside, shown tilted here. The ends of the elastic arms 6f are not connected to a core area 9f and may be freely deflected, and they have contact in this case with a rounded-off edge of a permanent magnet 5 and press it against rods 11f of an adjacent laminating sheet in a tangential direction (see FIG. 13). The elastic arms may be adapted to different geometries and requirements in that they are equipped with offsets, bulges, constrictions, and broadening or tapering areas. A significant advantage of this embodiment is that there is sufficient space for installation between the permanent magnets 5 tangentially opposite one another, which can be used for different configuration and arrangement of the elastic arms 6f.

Figure 15:
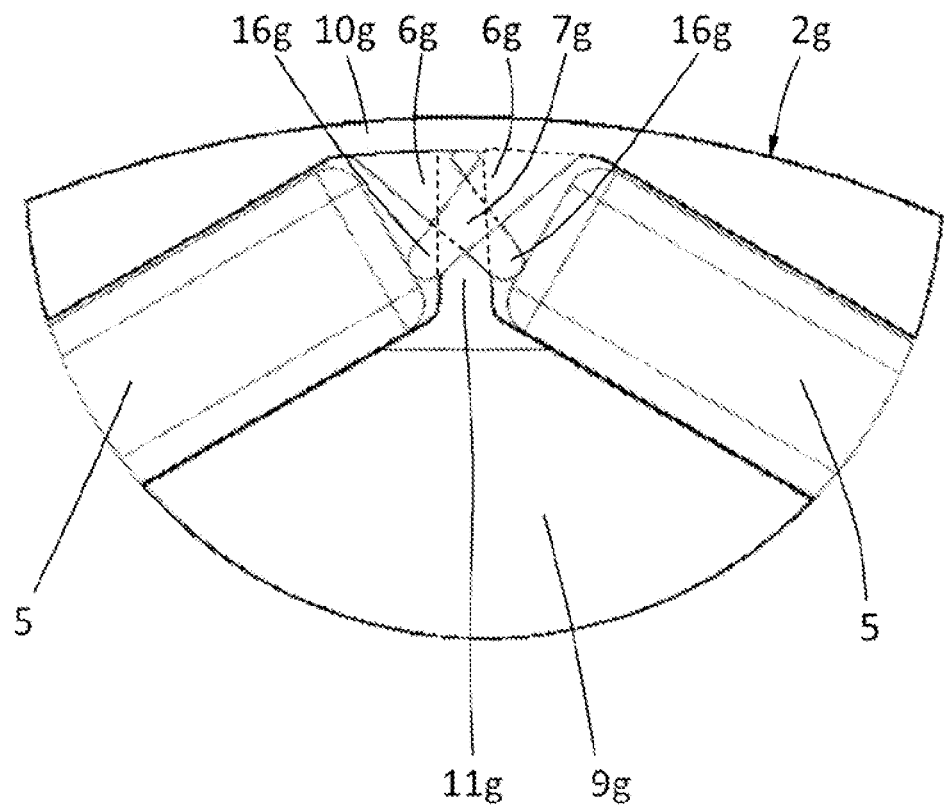
FIG. 15 in an enlarged section shows a third variant of a rotor of the second embodiment.

Finally, FIG. 15 in a partial axial view shows a third variant of a laminated core 2g of the second embodiment, in which the elastic arms 6g are tilted with respect to a radial, as in FIGS. 12 to 14. A section of a laminated core 2g is shown here, comprising three different laminating sheet sections or comprising two different laminating sheet sections, in which a laminating sheet section type is rotated by 180° around a straight line in the plane of the laminating sheet section. A laminating sheet section type has no elastic arms 6g but only rods 11g. The elastic arms 6g in this case are shorter than in FIGS. 12 to 14, whereby the ends thereof make contact with the side surfaces of the permanent magnets 5. By changing the numerical ratio of the different laminating sheet section types, the retaining force for the permanent magnets can be individually adapted. In this case as well, the elastic arms 6g extend from an external ring 10g and are not connected to a core area 9g. The differently tilted elastic arms 6g are positioned, one below the other in the axial direction of the motor, making contact over a large surface of the contact areas 7g. The areas 16g of the elastic arms 6g do not make contact with any contact area 7g. With this embodiment, as with the previous examples, both tangential ends of the permanent magnets 5 make contact only at elastic arms 6g and not at rods 11g as well. In this way, even better tolerance compensation possible.

Figure 16:
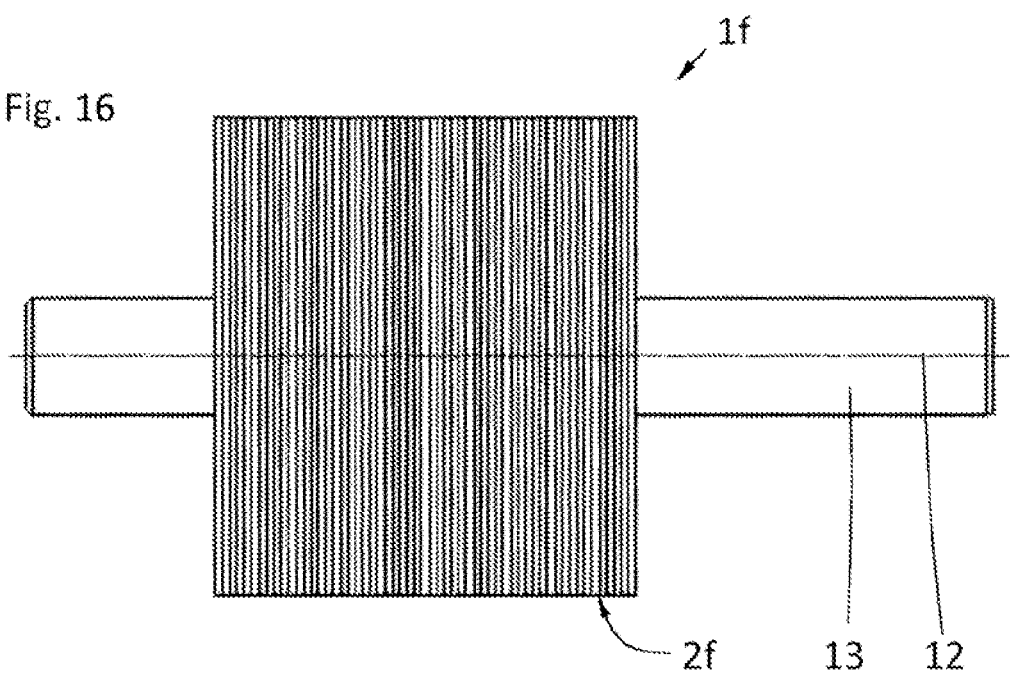
FIG. 16 shows a view of the rotor from FIG. 13 rotated by 90°.

FIG. 16 shows a view of the rotor 1f from FIG. 13, rotated by 90°, in which the laminated core 2f is mounted on a shaft 13.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

LIST OF REFERENCE NUMERALS

| | |
|---|---|
| 1a, 1d, 1f | Rotor |
| 2a, 2b, 2c, 2d, 2e, 2f, 2g | Laminated core |
| 3a, 3b, 3c, 3d, 3e | Laminating sheet |
| 4a, 4b, 4c, 4d, 4e | Slot |
| 5 | Permanent magnet |
| 6a, 6b, 6c, 6d, 6e, 6e', 6f, 6g, 6h, 6i, 6k | Arm |
| 7a, 7d, 7e, 7f, 7g | Contact area |
| 8a, 8b, 8b', 8c, 8c' | Recess |
| 9a, 9d, 9e, 9f, 9g, 9h, 9i, 9k | Core area |
| 10a, 10b, 10d, 10e, 10e', 10f, 10g | Ring |
| 11a, 11b, 11d, 11e, 11e' 11f, 11g | Connecting rod |
| 12 | Rotational axis |
| 13 | Shaft |
| 14 | Guidance projection |
| 15 | Retaining collar |
| 16a, 16d, 16f, 16g | Non-contact area |

What is claimed is:

1. An electrical motor having a rotor, the rotor comprising:
    a laminated core made up of a stacked plurality of laminating sheets each having an external ring and a core area;
    each laminating sheet having at least two tangentially extending slots, in each of which at least one permanent magnet is accommodated; and
    at least one of the laminating sheets has at least one elastic arm which is arranged between the at least two permanent magnets and lies against a permanent magnet and acts resiliently upon the permanent magnet in an essentially tangential direction, wherein
    the elastic arm of the one laminating sheet, with a first area of its axial surface, makes two-dimensional contact with a contact area of a connecting rod connected to and defined between the external ring and the core area of a further adjacent laminating sheet and is guided by the contact area of the connecting rod essentially tangentially in a manner that resists torsion and/or bending,
    that the elastic arm with a further area of the same axial surface cannot make contact on the same further laminating sheet thus defining a non-adjacent area, and
    that the elastic arm is substantially deformed by the permanent magnet in the tangential direction and rests elastically against the permanent magnet.

2. The electrical motor according to claim 1, wherein at least one part of the non-adjacent area extends to a point of contact between the permanent magnet and the elastic arm.

3. The electrical motor according to claim 1, wherein the elastic arm is guided between two contact areas of two adjacent laminating sheets on either side of the laminating sheet having the elastic arm.

4. The electrical motor according to claim 1, wherein the elastic arm is guided, on one side, on a contact area of another touching laminating sheet of the laminated core and, on the other side, rests against another elastic arm of an adjacent touching laminating sheet of the laminated core, such that two or more elastic arms are guided as a unit between two contact areas of two additional adjacent laminating sheets of the laminated core.

5. The electrical motor according to claim 1, wherein the laminating sheet with the elastic arm connects with the elastic arm directly to a contact area of an adjacent laminating sheet or connects axially before and axially after directly to the contact areas of two adjacent laminating sheets.

6. The electrical motor according to claim 1, wherein the elastic arm is less deflected at the point of contact with the permanent magnet than an edge or corner radius or than a lead-in chamfer of the permanent magnet.

7. The electrical motor according to claim 1, wherein the elastic arm makes contact in the area of an edge or at a side surface on the permanent magnet.

8. The electrical motor according to claim 1, wherein the elastic arm is extended from recesses defined in the core area.

9. The electrical motor according to claim 1, wherein each laminating sheet has at least one elastic arm and multiple potential contact areas.

10. The electrical motor according to claim 9, wherein the laminating sheets are positioned behind one another in an axial direction and rotated with respect to one another by at least one rotor pole pitch.

11. The electrical motor according to claim 1, wherein the laminated core consists of different types of laminating sheets, in which a first lamination type is formed with elastic arms and a second lamination type is formed without elastic arms but with contact areas.

12. The electrical motor according to claim 1, wherein two slots of a laminating sheet, between which the elastic arm is arranged, are positioned and connected to one another such that they form a single slot.

13. The electrical motor according to claim 1, wherein the laminating sheets are aligned precisely with one another in a manner that resists torsion so that they do not turn relative to each other.

14. The electrical motor according to claim 1, wherein the elasticity of the elastic arm is designed such that the moment of its deflection is significantly less than a bending moment that would cause the elastic arm to deform.

15. The electrical motor according to claim 1, wherein the non-adjacent area of the elastic arm between the permanent magnet and the adjacent area has a smaller surface area than the adjacent area and/or the tangential width of the non-adjacent area of the elastic arm between the permanent magnet and the adjacent area is smaller than the tangential width of the adjacent area.

* * * * *